United States Patent
Al-Shafei et al.

(10) Patent No.: US 11,365,358 B2
(45) Date of Patent: Jun. 21, 2022

(54) CONVERSION OF LIGHT NAPHTHA TO ENHANCED VALUE PRODUCTS IN AN INTEGRATED TWO-ZONE REACTOR PROCESS

(71) Applicant: Saudi Arabian Oil Company, Dhahran (SA)

(72) Inventors: Emad Naji Al-Shafei, Dhahran (SA); Mohammed Z. Al-Bahar, Dhahran (SA); Manal Al-Eid, Dhahran (SA); Lianhui Ding, Dhahran (SA); Ali Nader Al-Jishi, Dhahran (SA); Ki-Hyouk Choi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/879,948

(22) Filed: May 21, 2020

(65) Prior Publication Data
US 2021/0363438 A1   Nov. 25, 2021

(51) Int. Cl.
*C10G 65/12*   (2006.01)
*C10G 11/10*   (2006.01)

(52) U.S. Cl.
CPC ............ *C10G 65/12* (2013.01); *C10G 11/10* (2013.01); *C10G 2300/301* (2013.01); *C10G 2400/20* (2013.01)

(58) Field of Classification Search
CPC .... C10G 65/12; C10G 11/10; C10G 2400/20; C10G 2300/301; C10G 63/04;
(Continued)

(56) References Cited

U.S. PATENT DOCUMENTS 3,827,969 A * 8/1974 Wilson .................. C10G 63/04
                                                                  208/89
3,843,510 A  10/1974 Morrison et al.
(Continued)

FOREIGN PATENT DOCUMENTS

CN   101367048 A     2/2009
CN   102500409 A *   6/2012
(Continued)

OTHER PUBLICATIONS

International Search Report and Written Opinion dated Feb. 17, 2021 pertaining to International application No. PCT/US2020/060181 filed Nov. 12, 2020, 17 pgs.

*Primary Examiner* — Michelle Stein
(74) *Attorney, Agent, or Firm* — Dinsmore & Shohl LLP (57) ABSTRACT

An integrated process for conversion of a hydrocarbon stream comprising light naphtha to enhanced value products. The process includes passing the hydrocarbon stream through a first reactor, the first reactor being a catalytic bed reactor with a dual-function catalyst to simultaneously reform light naphtha to BTEX and crack light naphtha to ethane, propane, and butanes. Further, the process includes passing an effluent of the first reactor to a gas-liquid separating unit to generate a liquid stream and a gas stream, and passing the gas stream to a gas separator unit to remove hydrogen gas and methane and generate an enhanced gas stream. The process further includes passing the enhanced gas stream through a second reactor, the second reactor being a pyrolysis unit operated at steam cracking conditions to convert ethane, propane, and butanes in the enhanced gas stream to light. An associated system for performing the process is also provided wherein the integrated process does not include passage of a process stream to a separate and
(Continued)

independent hydrocracking unit to crack light alkanes in the hydrocarbon stream to smaller alkanes.

11 Claims, 4 Drawing Sheets

(58) Field of Classification Search
CPC .......... C10G 69/08; C10G 9/36; C10G 35/00; C10G 35/04; C10G 35/06; C10G 35/065; C10G 35/085; C10G 35/09; C10G 35/095
See application file for complete search history.

(56) References Cited

U.S. PATENT DOCUMENTS

| | | | | |
|---|---|---|---|---|
| 5,052,561 | A * | 10/1991 | Miller | C10G 35/095 208/137 |
| 5,552,033 | A * | 9/1996 | Shih | C10G 69/08 208/89 |
| 5,961,818 | A * | 10/1999 | Pradhan | B01J 29/405 208/120.01 |
| 6,869,576 | B2 * | 3/2005 | Espeillac | C10G 49/00 208/208 R |
| 7,128,827 | B2 | 10/2006 | Tallman et al. | |
| 9,856,425 | B2 | 1/2018 | Ward et al. | |
| 11,090,643 | B2 * | 8/2021 | Al-Shafei | B01J 29/90 |
| 2002/0082460 | A1 * | 6/2002 | Verduijn | C07C 2/864 585/475 |
| 2006/0243641 | A1 * | 11/2006 | Zhou | C10G 35/085 208/135 |
| 2008/0194900 | A1 | 8/2008 | Bhirud | |
| 2009/0151237 | A1 * | 6/2009 | Takegoshi | B01J 20/186 44/451 |
| 2010/0331590 | A1 | 12/2010 | Majumder et al. | |
| 2011/0132804 | A1 * | 6/2011 | Stevenson | B01J 29/047 208/65 |
| 2012/0277505 | A1 * | 11/2012 | Serban | C10G 35/06 585/302 |
| 2013/0020233 | A1 * | 1/2013 | Ma | C10G 61/06 208/66 |
| 2013/0296625 | A1 * | 11/2013 | Ghosh | B01J 29/047 585/417 |
| 2017/0114288 | A1 * | 4/2017 | Ravishankar | B01J 37/28 |
| 2017/0233664 | A1 * | 8/2017 | Funk | C10G 63/04 585/324 |
| 2018/0179455 | A1 | 6/2018 | Frey et al. | |

FOREIGN PATENT DOCUMENTS

| | | | |
|---|---|---|---|
| CN | 105452423 | A | 3/2016 |
| CN | 111229299 | A * | 6/2020 |
| EP | 3305748 | A1 | 4/2018 |
| WO | 0024509 | A1 | 5/2000 |
| WO | 2015000850 | A1 | 1/2015 |
| WO | 2016098909 | A1 | 6/2016 |

* cited by examiner

CONVERSION OF LIGHT NAPHTHA TO ENHANCED VALUE PRODUCTS IN AN INTEGRATED TWO-ZONE REACTOR PROCESS

TECHNICAL FIELD

The present disclosure relates to an integrated process and associated system for conversion of a hydrocarbon stream comprising light naphtha to enhanced value products.

BACKGROUND

Olefins as well as BTEX (benzene, toluene, ethylbenzene and xylene) are valuable chemicals frequently utilized in the production of many materials and formulation of many consumer goods. For example, olefins such as ethylene, propylene, butenes, and pentenes are frequently utilized in preparing polyethylenes, polypropylenes, polyisobutylene and other polymers, alcohols, vinyl chloride monomer, acrylonitrile, methyl tertiary butyl ether and tertiary amyl methyl ether and other petrochemicals, and a variety of rubbers such as butyl rubber. Similarly, BTEX compounds frequently utilized during the processing of petroleum products and during the production of consumer goods such as paints and lacquers, thinners, rubber products, adhesives, inks, cosmetics and pharmaceutical products. As such, their plentiful, efficient, and economical production is desirable.

Reformer units are a well-established process utilized for the production of BTEX from naphtha. However, a hydrotreating unit is required to remove sulfur from straight run middle naphtha feedstock, which has a boiling point range of 200 to 315° F., before injecting it into the reformer unit. Further, light naphtha, which has a boiling point range of 90 to 200° F., is presently not being used in reformers as it is considered inert to reforming reaction on conventional reforming catalysts, and thus generates a low yield of BTEX.

As light naphtha feedstock is traditionally not utilized by industry in a reformer to produce BTEX, it is generally sent to an isomer unit to produce hydrocarbon isomers to be used as an octane number booster or as part of a feedstock for a steam cracker when mixed with middle and heavy blend for naphtha units for olefins production. However, naphtha steam cracker units produce 40-50% of olefins, and a low yield of BTEX ranging from 10 to 13%. Generally, BTEX produced from naphtha steam cracker mainly consists of approximately 5 to 8 weight percent (wt. %) benzene, approximately 3 to 5 wt. % toluene, and a very low yield of xylene.

SUMMARY

Accordingly, there is a clear and long-standing need to provide an efficient and economical process for the production of BTEX and olefins from a feedstock comprising substantial quantities of light naphtha.

In accordance with one or more embodiments of the present disclosure, an integrated process for conversion of a hydrocarbon stream comprising light naphtha to enhanced value products is disclosed. The process includes (i) providing the hydrocarbon stream comprising light naphtha to a first reactor; (ii) passing the hydrocarbon stream through the first reactor, the first reactor being a catalytic bed reactor with a dual-function catalyst disposed therein to simultaneously reform light naphtha to BTEX and crack light naphtha to ethane, propane, and butanes; (iii) passing an effluent of the first reactor to a gas-liquid separating unit to generate a liquid stream comprising the BTEX and a gas stream comprising the ethane, propane, and butanes; (iv) passing the gas stream to a gas separator unit to remove hydrogen gas and methane from the gas stream and generate an enhanced gas stream comprising an increased concentration of ethane, propane, and butanes; and (v) passing the enhanced gas stream through a second reactor, the second reactor being a pyrolysis unit operated at steam cracking conditions to convert the ethane, propane, and butanes of the enhanced gas stream to light olefins including ethylene, propylene, and butenes. Further, the integrated process does not include passage of a process stream to a separate and independent hydrocracking unit to crack light alkanes in the hydrocarbon stream to smaller alkanes.

In accordance with one or more embodiments of the present disclosure, a system for conversion of a hydrocarbon stream comprising light naphtha to enhanced value products is disclosed. The system includes a first reactor fluidly connected to the hydrocarbon stream, the first reactor being a catalytic bed reactor with a dual-function catalyst disposed therein to simultaneously reform light naphtha to BTEX and crack light naphtha to ethane, propane, and butanes. The system further includes a gas-liquid separating unit fluidly connected to an outlet of the first reactor, the gas-liquid separating unit configured to generate a liquid stream comprising the BTEX at a liquid outlet and a gas stream comprising the ethane, propane, and butanes at a gas outlet. The system additionally includes a gas separator unit fluidly connected to the gas outlet of the gas-liquid separating unit, the gas separator unit configured to remove hydrogen gas and methane from the gas stream and generate an enhanced gas stream comprising an increased concentration of ethane, propane, and butanes at an enhanced gas outlet. Finally, the system includes a second reactor fluidly connected to the enhanced gas outlet of the gas separator, the second reactor being a pyrolysis unit operated at steam cracking conditions to convert the ethane, propane, and butanes of the enhanced gas stream to light olefins including ethylene, propylene, and butenes. Additionally, the system does not include an independent hydrocracking unit to crack light alkanes in the hydrocarbon feed to smaller alkanes.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Reference will now be made in detail to embodiments of an integrated process and associated system for conversion of a hydrocarbon stream comprising light naphtha to enhanced value products of the present disclosure. While the system for conversion of a hydrocarbon stream comprising light naphtha to enhanced value products of FIGS. 1 through 4 are provided as exemplary, it should be understood that the present systems and methods encompass other configurations.

The processes and systems of the present disclosure provide flexibility to directly convert light naphtha feedstocks with different qualities without a hydrotreating unit being required. For example, the processes of the present disclosure can accommodate light naphtha feedstocks that contain up to 1500 ppm sulfur, naphtha from a coker unit, naphtha from fluid catalytic cracking (FCC), straight run naphtha from a distillation unit, and light gas condensate. Further the processes are capable of handling the conversion of naphtha streams which have been processed with a hydrotreating unit, thereby providing great flexibility in the hydrocarbon stream provided to the system.

The processes of the present disclosure are able to handle the wide range of hydrocarbon feeds by utilizing reactors packed with extruded nano zeolite catalysts with alumina binders capable of simultaneously reforming light naphtha to BTEX as well as cracking light naphtha to ethane, propane, and butane. The simultaneous reforming and cracking is desirable as small alkanes such as ethane, propane, and butane are the preferred feed material to a pyrolytic steam cracking unit. As such, the cracking in conjunction with the reformation of the light naphtha eliminates the need for any further units to crack the light naphtha into smaller gas molecules.

Figure 1:
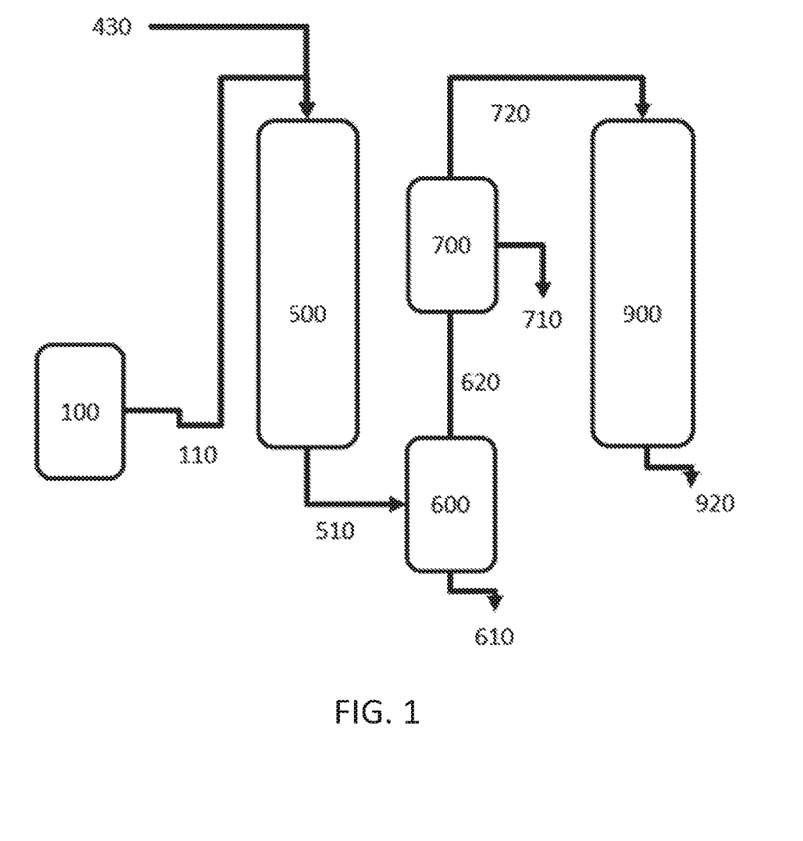
FIG. 1 is a schematic illustration of one or more embodiments of the integrated refinery process of the present disclosure.

In one or more embodiments, an integrated process for conversion of a hydrocarbon stream to enhanced value products includes providing a hydrocarbon stream 110 comprising light naphtha to a first reactor 500. The hydrocarbon stream comprising light naphtha 110 may be provided from a feedstock reservoir 100. The feedstock reservoir 100 may be the outlet of another process, a tank, or other source of desired hydrocarbons. The hydrocarbon stream 110 comprising light naphtha is passed through the first reactor 500 to simultaneously reform light naphtha in the hydrocarbon stream 110 to BTEX and crack light naphtha in the hydrocarbon stream 110 to ethane, propane, and butane. An effluent 510 of the first reactor 500 may be passed to a gas-liquid separating unit 600 to generate a liquid stream 610 comprising the BTEX and a gas stream 620 comprising the ethane, propane, and butanes. Further, the gas stream 620 may be transferred to a gas separator unit 700 to remove hydrogen gas and methane from the gas stream as an exhaust stream 710 and generate an enhanced gas stream 720 comprising an increased concentration of ethane, propane, and butanes. The enhanced gas stream 720 may then be processed in a second reactor 900 to convert the ethane, propane, and butane of the enhanced gas stream 720 to light olefins (olefins with a carbon-number of 4 or less) including ethylene, propylene, and butenes as a products stream 920. Further, in accordance with the various embodiments of the present disclosure, the integrated process does not include passage of a process stream to a separate and independent hydrocracking unit to crack light alkanes in the hydrocarbon feed to smaller alkanes.

The hydrocarbon stream 110 may comprise light naphtha or a blend of light naphtha with middle naphtha. For purposes of this disclosure, light naphtha is considered to have a boiling point range of 90 to 200° F. (approximately 32.2 to 93.3° C.) and middle naphtha is considered to have a boiling point range of 200 to 315° F. (approximately 93.3 to 157.2° C.). As such, in various embodiments, the hydrocarbon stream 110 may include hydrocarbons having a boiling point range of 90 to 315° F., 90 to 250° F., 90 to 200° F., 120 to 315° F., or 140 to 250° F. It is explicitly noted that each discrete value encompassed by the ranges are also included as well as the ranges that may be formed by each discrete value encompassed by the explicitly disclosed ranges are equally envisioned but would be impractical to list in full.

In various embodiments, the hydrocarbon stream 110 may comprise one or more of light gas condensate, straight run light naphtha, a mixture of light and middle naphtha, FCC naphtha, and coker unit naphtha. In one or more embodiments, the hydrocarbon stream 110 may comprise solely light naphtha or light naphtha combined with 0.1 to 70 wt. % middle naphtha.

In various embodiments, the hydrocarbon stream 110 may comprise organic sulfur compounds at an amount less than 1500 parts per million (ppm), less than 1200 ppm, less than 1000 ppm, in a range of 10 to 1500 ppm.

Figure 2:
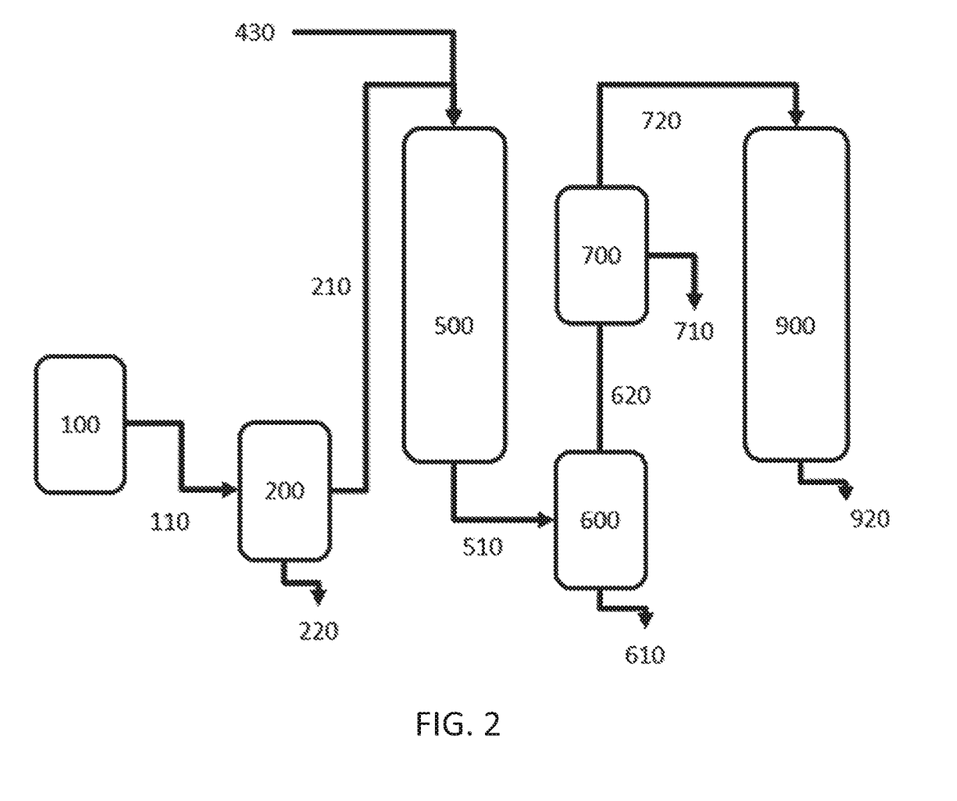
FIG. 2 is a schematic illustration of one or more embodiments of the integrated refinery process of the present disclosure including a MEROX unit.

In a first configuration, with reference to FIG. 2, the integrated process for conversion of a hydrocarbon stream comprising light naphtha to enhanced value products may additionally include providing the hydrocarbon stream 110 to a mercaptans oxidation (MEROX) unit 200. The MEROX unit 200 removes organic sulfur components from the hydrocarbon stream 110 to generate a MEROX sweetened hydrocarbon stream 210 prior to passing the MEROX sweetened hydrocarbon stream 210 through the first reactor 500.

Figure 3:
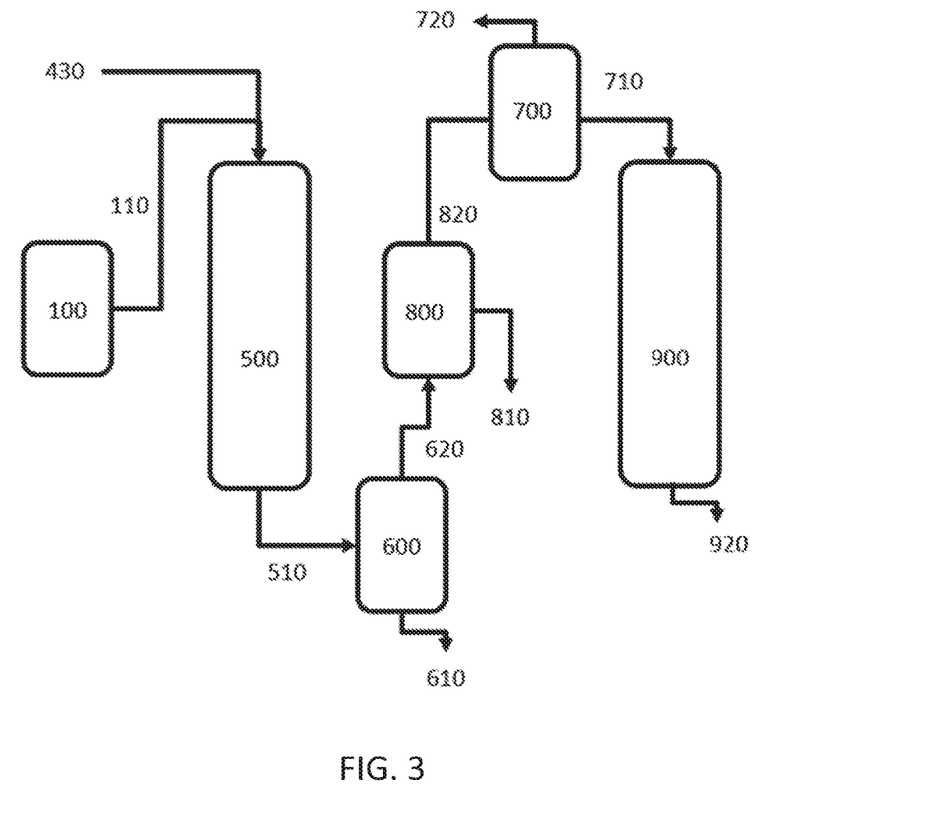
FIG. 3 is a schematic illustration of one or more embodiments of the integrated refinery process of the present disclosure including a gas scrubber unit.

In a second configuration, with reference to FIG. 3, the integrated process for conversion of a hydrocarbon stream comprising light naphtha to enhanced value products may additionally include passing the gas stream 620 from the gas-liquid separating unit 600 through a gas scrubber unit 800. The gas scrubber unit 800 may be configured to remove hydrogen sulfide from the gas stream 620 prior to passing a sweetened gas stream 820 to the gas separator unit 700.

Figure 4:
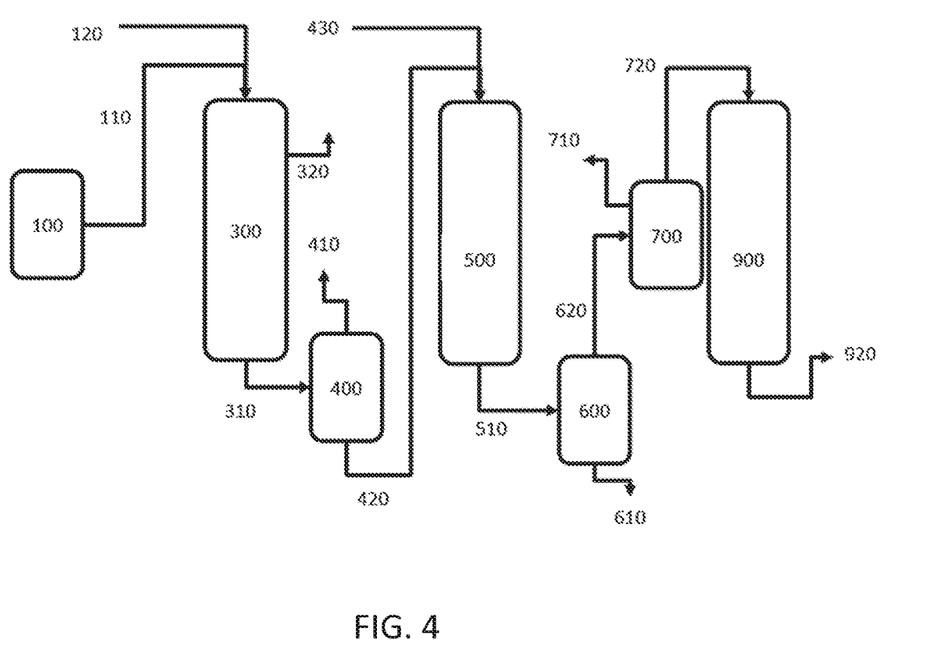
FIG. 4 is a schematic illustration of one or more embodiments of the integrated refinery process of the present disclosure including a hydrotreater unit.

In a third configuration, with reference to FIG. 4, the integrated process for conversion of a hydrocarbon stream comprising light naphtha to enhanced value products may additionally include providing the hydrocarbon stream 110 to a hydrotreater unit 300 operating to convert organic sulfur components from the hydrocarbon stream 110 to hydrogen sulfide and generate a hydrotreated hydrocarbon stream 310. Further, the hydrotreated hydrocarbon stream 310 may be transferred to a separator unit 400 to remove the generated hydrogen sulfide and hydrogen gas from the hydrotreated hydrocarbon stream 310 and generate a hydrotreated sweetened hydrocarbon stream 420. The hydrotreated sweetened hydrocarbon stream 420 may then ultimately be routed to the first reactor 500 for further processing and conversion to enhanced value products.

Having disclosed the basic operation of the integrated process for conversion of a hydrocarbon stream comprising light naphtha to enhanced value products, each step of the embodiments of the integrated process are now provided in further detail.

In one or more embodiments, the first reactor 500 may be a catalytic bed reactor with a dual-function catalyst disposed therein to perform the simultaneous reforming and cracking of the light naphtha in the hydrocarbon stream 110. The catalytic bed reactor of the first reactor 500 may operate as a fixed bed reactor in one or more embodiments. In further embodiments, the catalytic bed reactor of the first reactor 500 may operate as a moving bed reactor.

The dual-function catalyst may comprise a ZSM-5 zeolite catalyst. It will be appreciated that ZSM-5 is an aluminosilicate zeolite belonging to the pentasil family of zeolites and having a chemical formula of $Na_nAl_nSi_{96-n}O_{192} \cdot 16H_2O$ (0<n<27).

In one or more embodiments in accordance with at least the first and second configurations, the dual-function catalyst may comprise a nano ZSM-5 zeolite coated with amorphous silica or silica-alumina. The coating of the amorphous silica or silica-alumina on the nano ZSM-5 zeolite acts to increase the micropores reactivity and cracking activity of the nano ZSM-5 zeolite by deactivating the external acid sites. In one or more embodiments, the nano ZSM-5 zeolite coated with amorphous silica or silica-alumina comprises 1 to 20 weight percent (wt. %) of the amorphous silica or silica-alumina. In various further embodiments, the nano ZSM-5 zeolite coated with amorphous silica or silica-alumina comprises 1 to 15 wt. %, 2 to 10 wt. %, 3 to 7 wt. %, or 3 to 5 wt. % of the amorphous silica or silica-alumina.

The nano ZSM-5 zeolite may be further defined by specific material properties. In various embodiments, the nano ZSM-5 zeolite may comprise a silica to alumina molar ratio of 10 to 1000, 10 to 800, 20 to 600, 20 to 400, or 30 to 200. In various embodiments, the nano ZSM-5 zeolite may comprise a crystal size in the range of 10 to 600 nanometers (nm), 20 to 500 nm, 30 to 450, 40 to 400 nm, or 50 to 300 nm. As will be appreciated by one skilled in the art, a zeolite may be defined as a nano-zeolite when the crystal size is below 1 micrometer (1000 nm) and as such is measured on a nano scale.

The amorphous silica or silica-alumina enables the nano ZSM-5 zeolite to tolerate limited organic sulfur compounds in the hydrocarbon stream 110. As the nano ZSM-5 zeolite coated with amorphous silica or silica-alumina can tolerate sulfur, it is not required to hydrotreat the feedstock prior to the conversion process. Without wishing to be bound by theory, it is believed that the lack of noble metal loading eliminates the concern of sulfur poisoning of the catalytic acid sites. Conversely, the presence of platinum as in the noble metal catalyst Pt—$Al_2O_3$ may be poisoned by organic sulfur. In one or more embodiments, the dual-function catalyst in the form of nano ZSM-5 zeolite coated with amorphous silica or silica-alumina may tolerate a sulfur content of 1500 parts per million (ppm) or less by weight.

In the manufacturing process of the dual-function catalyst, the amorphous silica or silica-alumina may be present only on external pores of the nano ZSM-5 zeolite. Specifically, the internal pores of nano ZSM-5 zeolite are initially blocked followed by silica or silica-alumina deposition on the external surface of the catalyst by an impregnation method. The catalyst is subsequently calcined to form amorphous silica or silica-alumina to block the external surface and re-open the internal pores. Finally, the nano ZSM-5 zeolite coated with amorphous silica or silica-alumina is mixed with an alumina binder to form the dual-function catalyst.

In one or more embodiments in accordance with at least the third configuration, the dual-function catalyst comprises a nano ZSM-5 zeolite impregnated with one or more metals. The nano ZSM-5 zeolite may be impregnated with one or more noble metals. For example, in various embodiments, the dual-function catalyst is impregnated with one or more of platinum, palladium, iridium, rhenium, and ruthenium. The nano ZSM-5 zeolite may alternatively be impregnated with one or more noble metals and one or more non-noble metals. For example, in various embodiments, the dual-function catalyst is impregnated with one or more of platinum, palladium, iridium, rhenium, and ruthenium as well as one or more of copper, cobalt, zinc, iron, tungsten, and molybdenum. The nano ZSM-5 zeolite impregnated with one or more metals may comprise 0.5 to 7.5 wt. % of the metals prior to binding the nano ZSM-5 zeolite with an alumina binder to form the dual-function catalyst. In various embodiments, the binder may comprise 20 to 60 wt. % of the formed dual-function catalyst. It will be appreciated, the nano-ZSM forming the dual-function catalyst should be in the hydrogen form prior to binding with the alumina binder.

In one or more embodiments in accordance with at least the third configuration, the dual-function catalyst comprising nano ZSM-5 zeolite impregnated with one or more metals may have an acidity of 0.5 to 1.5 millimole (mmole) ammonia per gram of the dual-function catalyst. It will further be appreciated that the dual-function catalyst may not comprise any alkaline or alkaline earth metals with an understanding that a sodium content of less than 0.05 wt. % may be tolerated.

In one or more embodiments and in accordance with the various configurations, the hydrocarbon stream 110, the MEROX sweetened hydrocarbon stream 210, and the hydrotreated sweetened hydrocarbon stream 420 are provided to the first reactor 500 at a liquid space velocity of 0.1 to 20 $h^{-1}$. In various further embodiments, the hydrocarbon stream 110, the MEROX sweetened hydrocarbon stream 210, and the hydrotreated sweetened hydrocarbon stream 420 are provided to the first reactor 500 at a liquid hourly space velocity (LHSV) of 0.1 to 15 $h^{-1}$, 0.2 to 10 $h^{-1}$, 0.3 to 5 $h^{-1}$, or 0.5 to 3 $h^{-1}$. It will be appreciated that an increased LHSV results in a reduced naphtha conversion and a commensurate reduction in olefin yield. Similarly, a reduction in LHSV results in increased naphtha conversion resulting in a product stream with increased methane content due to the further cracking.

In one or more embodiments and in accordance with the various configurations, the first reactor 500 may be operated at a reaction temperature of 400 to 700° C. In various embodiments in accordance with the first configuration in particular, the first reactor 500 may be operated at a reaction temperature of 400 to 650° C., 400 to 600° C., 400 to 550° C., or 400 to 500° C. In various embodiments in accordance with the second configuration in particular, the first reactor 500 may be operated at a reaction temperature of 400 to 650° C., 450 to 700° C., 450 to 650° C., or 450 to 550° C. In various embodiments in accordance with the third configuration in particular, the first reactor 500 may be operated at a reaction temperature of 350 to 700° C., 400 to 600° C., 400 to 550° C., or 400 to 500° C.

In one or more embodiments and in accordance with at least the first and second configurations, the first reactor 500 may be pressurized with nitrogen gas. The nitrogen gas may be provided to the first reactor 500 through gas feed 430. In various embodiments, the nitrogen gas provides a pressure of 1 to 50 bar, 1 to 35 bar, 2 to 25, or 3 to 15 bar for operation of the first reactor 500. As the present process is capable of achieving the desired conversion at the delineated pressures, it is unnecessary to supply a greater pressure as conversion will not be further increased while processing costs are increased. In various embodiments, the nitrogen gas may also be provided at a space velocity of 0.1 to 100 h$^{-1}$, 0.5 to 80 h$^{-1}$, 0.8 to 50 h$^{-1}$, or 1 to 20 h$^{-1}$ though the first reactor 500.

Operation of the first reactor 500 in accordance with at least the first or second configurations and the nano ZSM-5 zeolite coated with amorphous silica or silica-alumina may result in production of the effluent 510 comprising various components with a liquid yield of 35 to 65 wt. % and a gas yield of 45 to 65 wt. %. For example, for a hydrocarbon feed 110 consisting of light naphtha the liquid yield may be 35 to 45 wt. % and a gas yield of 55 to 65 wt. %. Further, for a hydrocarbon feed 110 consisting of a 1:1 weight ratio of light and middle naphtha the liquid yield may be 45 to 55 wt. % and a gas yield of 45 to 55 wt. %.

In one or more embodiments, the effluent 510 includes 20 to 40 wt. % of BTEX. For example, for a hydrocarbon feed 110 consisting of light naphtha the BTEX yield may be 20 to 30 wt. %. Further, for a hydrocarbon feed 110 consisting of a 1:1 weight ratio of light and middle naphtha the BTEX yield may be 25 to 35 wt. %. In various embodiments, the selectivity of the BTEX components in the effluent 510 may be 10 to 15 wt. % benzene, 30 to 45 wt. % toluene, 5 to 10 wt. % ethylbenzene, and 30 to 40 wt. % xylenes.

In one or more embodiments, the effluent 510 includes 10 to 25 wt. % of reformate with an octane number greater than 91. For example, for a hydrocarbon feed 110 consisting of light naphtha the reformate yield may be 10 to 15 wt. %. Further, for a hydrocarbon feed 110 consisting of a 1:1 weight ratio of light and middle naphtha the reformate yield may be 15 to 25 wt. %.

In one or more embodiments, the effluent 510 includes 40 to 45 wt. % of ethane, propane, and butanes. The selectivity between ethane, propane, and butanes may be 30 to 20 to 40 wt. % ethane, 50 to 75 wt. % propane, and 5 to 10 wt. % butanes. For example, for a hydrocarbon feed 110 consisting of light naphtha the breakdown of the of ethane, propane, and butanes in the effluent 510 may be 30 to 35 wt. % ethane, 55 to 65 wt. % propane, and 5 to 10 wt. % butanes. Further, for a hydrocarbon feed 110 consisting of a 1:1 weight ratio of light and middle naphtha the breakdown of the of ethane, propane, and butanes in the effluent 510 may be 20 to 25 wt. % ethane, 70 to 75 wt. % propane, and 5 to 10 wt. % butanes.

In one or more embodiments, the effluent 510 includes 5 to 15 wt. % of methane and 5 to 7 wt. % of hydrogen gas. For example, for a hydrocarbon feed 110 consisting of light naphtha the effluent 510 may comprises 10 to 13 wt. % methane and 5 to 7 wt. % hydrogen gas. Further, for a hydrocarbon feed 110 consisting of a 1:1 weight ratio of light and middle naphtha the effluent 510 may comprise 5 to 10 wt. % methane and 5 to 7 wt. % hydrogen gas.

In one or more embodiments and in accordance with at least the third configuration, the first reactor 500 may be pressurized with hydrogen gas. The hydrogen gas may be provided to the first reactor 500 through gas feed 430. The pressurization with hydrogen gas supports the function of the dual-function catalyst. Further, in combination with a noble metal, the hydrogen may assist more cyclization over the noble metal in embodiments of the dual-function catalyst. In various embodiments, the hydrogen gas provides a pressure of 1 to 50 bar, 1 to 35 bar, 2 to 25, or 3 to 15 bar for operation of the first reactor 500. As the present process is capable of achieving the desired conversion at the delineated pressures, it is unnecessary to supply a greater pressure as conversion will not be further increased while processing costs are increased. In various embodiments, the hydrogen gas may also be provided at a space velocity of 0.1 to 100 h$^{-1}$, 1 to 80 h$^{-1}$, 2 to 50 h$^{-1}$, or 5 to 20 h$^{-1}$ though the first reactor 500.

In one or more embodiments and in accordance with at least the third configuration, the dual-function catalyst comprising nano ZSM-5 zeolite impregnated with one or more metals may be reduced under hydrogen flow at a temperature of 450 to 550° C. before initiating flow of the hydrotreated sweetened hydrocarbon stream 420 to the first reactor 500.

The effluent 510 of the first reactor 500 may be passed to the gas-liquid separating unit 600 to generate the liquid stream 610 and the gas stream 620 as separated streams. The catalytic process within the first reactor 500 produces BTEX from the light naphtha or mixture of light naphtha and middle naphtha of the hydrocarbon stream 110. Specifically, within the effluent 510 of the first reactor 500 there may be BTEX, reformate, and light gases cracked from the hydrocarbon feedstock provided to the first reactor 500. The liquid stream 610 may contain BTEX alongside reformate with a high octane number. For purposes of this disclosure, a high octane number is considered an octane greater than 91. An octane number above 91 provides a preferred reformate for gasoline blending. The gas stream 620 may contain the light gases including ethane, propane, and butanes. It will be appreciated that light gases are considered to be hydrocarbon gases with a carbon chain of 4 or less.

The gas-liquid separating unit 600 may comprise any system for separating a gas stream and a liquid stream known to those skilled in the art. It will be appreciated that in one or more embodiments, the gas-liquid separating unit may be fluidly connected to an outlet of the first reactor with the gas-liquid separating unit configured to generate the liquid stream comprising the BTEX at a liquid outlet and the gas stream comprising the ethane, propane, and butanes at a gas outlet.

In one or more embodiments, the liquid stream 610 from the gas-liquid separating unit 600 may be processed to further separate the various components of the liquid stream 610. For example, as the liquid steam 610 may comprise BTEX compounds and reformate with a high octane number, separation allows the high octane reformate product to be utilized in the gasoline pool and the BTEX compounds to be collected for sale or internal utilization as a valuable chemical.

The gas stream 620 from the gas-liquid separating unit 600 in the first and third configurations and the sweetened gas stream 820 from the gas scrubber unit 800 in the second configuration may be transferred to the gas separator unit 700 to remove hydrogen gas and methane. The hydrogen and methane removed from the gas stream 620 or sweetened gas stream 820 upon processing within the gas separator unit 700 generates the exhaust stream 710. The residual of the gas stream 620 or sweetened gas stream 820 upon removal of hydrogen and methane from the gas stream 620 or sweetened gas stream 820 generates the enhanced gas stream 720. It will be appreciated that the enhanced gas stream 720 comprises an increased concentration of ethane, propane, and butanes relative to the gas stream 620 or sweetened gas stream 820 initially provided to the gas separator unit 700.

The gas separator unit 700 may comprise any system for removing hydrogen and methane from a gas stream as known to those skilled in the art. It will be appreciated that in one or more embodiments, the gas separator unit may be fluidly connected to the gas outlet of the gas-liquid separating unit with the gas separator unit configured to remove hydrogen gas and methane from the gas stream and generate the enhanced gas stream at an enhanced gas outlet.

In one or more embodiments, the hydrogen removed as part of the exhaust stream 710 from the gas separator unit 700 represents 4 to 8 wt. % of the gas stream 620 from the gas-liquid separating unit 600 in the first and third configurations and the sweetened gas stream 820 from the gas scrubber unit 800 in the second configuration.

In one or more embodiments, the methane removed as part of the exhaust stream 710 from the gas separator unit 700 represent 6 to 12 wt. % of the gas stream 620 from the gas-liquid separating unit 600 in the first and third configurations and the sweetened gas stream 820 from the gas scrubber unit 800 in the second configuration The hydrogen and methane collected in the exhaust stream 710 from the gas separator unit 700 may be advantageously utilized within the integrated process. Specifically, the hydrogen and methane within the exhaust stream 710 may be further separated with a stream of purified hydrogen and a stream of purified methane being generated for consumption within other unit operations of the integrated process. In one or more embodiments, the methane extracted from the exhaust stream 710 may be utilized as a fuel for the integrated process through combustion of the methane to generate heat. In one or more embodiments in accordance with at least the third configuration in particular, the hydrogen extracted from the exhaust stream 710 may be recycled and combined with the hydrogen feed providing the gas feed 430 to the first reactor 500 or the hydrogen inlet 120 to the hydrotreater unit 300.

The enhanced gas stream 720 may be processed in the second reactor 900 to convert the ethane, propane, and butane of the enhanced gas stream 720 to light olefins including ethylene, propylene, and butenes as the products stream 920. In one or more embodiments, the second reactor 900 may specifically be a pyrolysis unit operated at steam cracking conditions to convert the ethane, propane, and butanes of the enhanced gas stream to light olefins including ethylene, propylene, and butenes.

The second reactor 900 may comprise any system operating as a pyrolysis unit for steam cracking as known to those skilled in the art. It will be appreciated that in one or more embodiments, the second reactor may be fluidly connected to the enhanced gas outlet of the gas separator with the second reactor being a pyrolysis unit operated at steam cracking conditions to convert the ethane, propane, and butanes of the enhanced gas stream to light olefins at a product outlet.

In one or more embodiments and in accordance with the various configurations, the pyrolysis unit of the second reactor 900 may be operated at a cracking temperature of 750 to 900° C.

In one or more embodiments and in accordance with the various configurations, the pyrolysis unit of the second reactor 900 may be operated with a steam to hydrocarbon ratio of 0.1:1 to 0.6:1. In further embodiments, the pyrolysis unit of the second reactor 900 may be operated with a steam to hydrocarbon ratio of 0.1:1 to 0.5:1.

In one or more embodiments, the products stream 920 comprises 30 to 40 wt. % ethylene, 15 to 20 wt. % propylene, 1 to 5 wt. % butenes, and 1 to 3 wt. % of BTX (mixture of benzene, toluene, and the three xylene isomers).

In one or more embodiments in accordance with the first configuration, the integrated process for conversion of a hydrocarbon stream comprising light naphtha to enhanced value products comprises the MEROX unit 200. The MEROX unit 200 operates in accordance with procedures and methods known to those skilled in the art to reduce the organic sulfur content of the hydrocarbon stream 110 to generate the MEROX sweetened hydrocarbon stream 210. In various embodiments, the MEROX sweetened hydrocarbon stream 210 comprises organic sulfur components at less than 200 ppm, less than 100 ppm, or less than 50 ppm, each on a weight basis.

In one or more embodiments in accordance with the second configuration, the integrated process for conversion of a hydrocarbon stream comprising light naphtha to enhanced value products comprises the gas scrubber unit 800. It will be appreciated that organic sulfur compounds may be converted to hydrogen sulfide in the first reactor 500 and removal of the same is desirable before passage to the second reactor 900. The gas scrubber unit 800 operates in accordance with procedures and methods known to those skilled in the art to reduce the hydrogen sulfide content of a gas feed. In the present application, the gas scrubber unit 800 removes hydrogen sulfide from the gas stream 620 prior to passing the newly generated sweetened gas stream 820 to the gas separator unit 700. In one or more embodiments, hydrogen sulfide may be present in the gas stream 620 at 25 to 1000 ppm. The sweetened gas stream 820 may comprise hydrogen sulfide at a concentration of less than 5 ppm, such as 0.1 to 5 ppm.

In one or more embodiments in accordance with the third configuration, the integrated process for conversion of a hydrocarbon stream comprising light naphtha to enhanced value products comprises the hydrotreater unit 300. One skilled in the art will appreciate that operation of the hydrotreater unit 300 results in generation of a gas rich in hydrogen sulfide which may be removed from the top of the hydrotreater unit 300 and a liquid hydrocarbon steam which is substantially free of sulfur compounds being drawn at the bottom of the hydrotreater unit 300. The hydrotreater unit 300 operates to convert organic sulfur components within the hydrocarbon stream 110 to hydrogen sulfide and produce the hydrotreated hydrocarbon stream 310 and the hydrotreater exhaust stream 320. The hydrotreater exhaust stream 320 represents the stream of gas rich in hydrogen sulfide generated at the top of the unit operation equipment in a hydrotreating process. In various embodiments, the hydrotreated hydrocarbon stream 310 exiting the hydrotreater unit 300 comprises less than 1 ppm, less than 0.5 ppm, or less than 0.2 ppm of organic sulfur components.

Operation of a hydrotreating unit includes mixing the feed stream of hydrocarbons with hydrogen gas, heating and pressurizing the resultant mixture, and passing the same over a catalyst to convert the sulfur containing compounds to hydrogen sulfide and desulfinated hydrocarbons. In one or more embodiments, the hydrotreater unit 300 may comprise a CoMo/alumina or NiMo/alumina catalyst. In one or more embodiments, the hydrotreater unit 300 may operate at a temperature of 250 to 350° C. In one or more embodiments, the hydrotreater unit 300 may operate at a pressure of 20 to 50 bar with the introduction of hydrogen via hydrogen inlet 120. In one or more embodiments, the hydrotreater unit 300 may operate with a space velocity of the hydrocarbon of 1 to 10 $h^{-1}$.

The hydrotreated hydrocarbon stream 310 exiting the hydrotreater unit 300 may be transferred to the separator unit 400 to further remove the generated hydrogen sulfide and hydrogen gas from the hydrotreated hydrocarbon stream 310 to generate the hydrotreated sweetened hydrocarbon stream 420. The hydrotreated sweetened hydrocarbon stream 420 may then ultimately be routed to the first reactor 500 for further processing and conversion to enhanced value products. The separator unit 400 operates in accordance with procedures and methods known to those skilled in the art for separation of a liquid and a gas stream. In one or more embodiments, the hydrogen separated from hydrotreated hydrocarbon stream 310 may then be recycled and combined with the hydrogen feed providing the gas feed 430 to the first reactor 500 or the hydrogen inlet 120 to the hydrotreater unit 300.

EXAMPLES

The following examples illustrate features of the present disclosure but are not intended to limit the scope of the disclosure.

To verify the dual-functionality of the dual-function catalyst in the first reactor to both reform light naphtha to BTEX as well as crack light naphtha to ethane, propane, and butanes, laboratory scale demonstrations were completed for multiple hydrocarbon stream compositions.

A dual-function catalyst in accordance with one or more embodiments of the present disclosure was prepared for utilization in the laboratory scale demonstrations. Initially, a nano ZSM-5 zeolite in the hydrogen formed was prepared. The nano ZSM-5 was prepared using a dry gel method familiar to those skilled in the art. The gel composition used for the synthesis of the nano sized ZSM 5 zeolite was: $60SiO_2: 21.4TPAOH: 1Al_2O_3: 650H_2O$. The gel was prepared by dissolving aluminum sulfate $(Al_2(SO_4)_3 \cdot 18H_2O)$ in tetrapropylammonium hydroxide (TPAOH) (Aldrich, 40% aqueous solution) to form a first solution. Tetraethylorthosilicate (TEOS) and additional TPAOH aqueous solution were also combined to form a second solution as a slurry. The first solution was then added to the second solution to form the aluminosilicate fluid gel having the composition previously provided. The formed aluminosilicate fluid gel was stirred in a beaker at ambient temperature for 4 hours and subsequently dried without stirring overnight at 80° C. to remove the water and alcohols and form a dry gel. The dry gel was put on a holder in an autoclave along with water to hydrothermally treat the dry gel at 170° C. for 3 days. The resulting solid product was washed three times and separated with super speed centrifuge (10000 rpm) between washes. The tripled washed solid product was dried at 110° C. overnight, and calcined at 550° C. for 7 hours with a ramp of 2° C. per minute.

The prepared nano ZSM-5 zeolite crystals had a silica to alumina molar ratio of 50. Further, the prepared nano ZSM-5 zeolite crystals were coated with 5 wt. % amorphous silica to generate the nano ZSM-5 zeolite within the dual-function catalyst.

Inventive Example 1

An initial experimental verification of the functionality of the dual-function catalyst was undertaken for a hydrocarbon stream comprising straight run light naphtha. The straight run light naphtha comprises a sulfur content of approximately 30 ppm, a density of 0.676 grams per milliliter (g/ml), and a boiling point of 90 to 200° F. A catalytic packed bed reactor in accordance with the first reactor of the present disclosure was loaded with the dual-function catalyst as prepared supra. The reaction of the hydrocarbon stream in the catalytic packed bed reactor was carried out at a liquid space velocity of 2 h$^{-1}$, 460° C., and 10 bar with pressurization by nitrogen gas.

The effluent from the catalytic packed bed reactor was sent to a gas-liquid separator where the gas and liquid hydrocarbon products were separated for analysis. Table 1 presents the liquid product distribution from the conversion of the straight run light naphtha at 460° C. as well as the composition of the straight run light naphtha prior to conversion. Similarly, Table 2 presents the gas product distribution from the conversion of the straight run light naphtha at 460° C.

TABLE 1

Liquid Product Distribution - Inventive Example 1

| Compound | Feed of straight run light naphtha (b.p 90-200° F.) Wt. % | Product after processing in First Reactor at 460° C. Wt. % |
|---|---|---|
| Liquid yield, wt. % | 100 | 40 |
| Benzene | 1.1 | 3.5 |
| Toluene | 0.1 | 9.5 |
| Ethyl benzene | 0.0 | 1.6 |
| Xylene | 0.0 | 10.5 |
| BTEX | 1.2 | 25.1 |
| RON | 65.0 | >91 |
| Paraffins | 53.43 | 1.1 |
| I-Paraffins | 38.64 | 0.8 |
| Aromatics | 1.13 | 36.6 |
| Naphthenes | 6.81 | 0.3 |
| Olefins | 0 | 0 |
| Reformate yield | — | 13.7 |

TABLE 2

Gas Product Distribution - Inventive Example 1

| Compound | Product after processing in First Reactor at 460° C. |
|---|---|
| Gas yield | 60 |
| Hydrogen | 5.9 |
| Methane | 12.5 |
| Ethane | 13.7 |
| Propane | 24.2 |
| Butane | 3.1 |
| Total ethane, propane and butane | 41.0 |
| Other gases | 0.7 |

A review of Tables 1 and 2 indicate the liquid yield was around 40 wt. % and the gas yield was around 60 wt. %. Further, PIONA (paraffins, isoparaffins, olefins, naphthenes, and aromatics) analysis showed that BTEX were attained with 25.1 wt. % yield compared to the 1.2 wt. % found in the feedstock before conversion. Additionally, reformate with high octane number of greater than 91 was obtained with 13.7 wt. % yield. Analysis of the gas product distribution indicates ethane, propane and butanes were produced with 41 wt. % yield. The gas products also include hydrogen gas at 5.9 wt. % and methane at 12.5 wt %, which can be used as fuel for the process. It will be appreciated that each of these products provide enhanced value to the initial straight run light naphtha feed.

Inventive Example 2

A further experimental verification of the functionality of the dual-function catalyst was undertaken for a hydrocarbon stream comprising 50 wt. % straight run light naphtha and 50 wt. % straight run middle naphtha. The straight run light naphtha comprises a sulfur content of approximately 30 ppm, a density of 0.676 g/ml, and a boiling point of 90 to 200° F. The straight run middle naphtha comprises a sulfur content of approximately 250 ppm, a density of 0.737 g/ml, and a boiling point of 200 to 315° F. A catalytic packed bed reactor in accordance with the first reactor of the present disclosure was loaded with the dual-function catalyst as prepared supra. The reaction of the hydrocarbon stream in the catalytic packed bed reactor was carried out at a liquid space velocity of 2 $h^{-1}$, 460° C., and 10 bar with pressurization by nitrogen gas.

The effluent from the catalytic packed bed reactor was sent to a gas-liquid separator where the gas and liquid hydrocarbon products were separated for analysis. Table 3 presents the liquid product distribution from the conversion of the 1:1 straight run light naphtha and straight run middle naphtha at 460° C. as well as the composition of the combined straight run light and middle naphtha prior to conversion. Similarly, Table 4 presents the gas product distribution from the conversion of the straight run light and middle naphtha at 460° C.

TABLE 3

Liquid Product Distribution - Inventive Example 2

| Compound | Feed of straight run light and middle naphtha (b.p 90-315° F.) Wt. % | Product after processing in First Reactor at 460° C. Wt. % |
|---|---|---|
| Liquid yield, wt. % | 100 | 50 |
| Benzene | 0.7 | 3.6 |
| Toluene | 1.3 | 11.5 |
| Ethyl benzene | 0.5 | 2.1 |
| Xylene | 1.5 | 12.1 |
| BTEX | 4 | 29.2 |
| RON | 51 | >91 |
| Paraffins | 33.5 | 0.6 |
| I-Paraffins | 38.8 | 2.7 |
| Aromatics | 18.0 | 14.6 |
| Naphthenes | 9 | 2.4 |
| Olefins | 0.7 | 0 |
| Reformate yield | 0 | 20.4 |

TABLE 4

Gas Product Distribution - Inventive Example 2

| Compound | Product after processing in First Reactor at 460° C. |
|---|---|
| Gas yield | 50 |
| Hydrogen | 6.3 |
| Methane | 6.5 |
| Ethane | 7.7 |
| Propane | 25.6 |
| Butane | 2.1 |
| Total ethane, propane and butane | 35.4 |
| Other gases | 1.8 |

A review of Tables 3 and 4 indicate the liquid yield was around 50 wt. % and the gas yield was around 50 wt. %. Further, PIONA (paraffins, isoparaffins, olefins, naphthenes, and aromatics) analysis showed that BTEX were attained with 29.3 wt. % yield compared to the 4 wt. % found in the feedstock before conversion. Additionally, reformate with high octane number of greater than 91 was obtained with 20.4 wt. % yield. Analysis of the gas product distribution indicates ethane, propane and butanes were produced with 35.4 wt. % yield. The gas products also include hydrogen gas at 6.3 wt. % and methane at 6.5 wt %, which can be used as fuel for the process. It will be appreciated that each of these products provide enhanced value to the initial straight run light and middle naphtha feed.

It will be appreciated that the ethane, propane and butanes produced in accordance with Inventive Example 1 and Inventive Example 2 could then be further supplied to a pyrolysis reactor in accordance with the second reactor of the present disclosure to generate the desirable light olefins. Generation of such light olefins from ethane, propane and butanes has been previously demonstrated.

It should now be understood the various aspects of the integrated process and system for conversion of a hydrocarbon stream comprising light naphtha to enhanced value products are described and such aspects may be utilized in conjunction with various other aspects.

According to a first aspect, an integrated process for conversion of a hydrocarbon stream comprising light naphtha to enhanced value products includes (i) providing the hydrocarbon stream comprising light naphtha to a first reactor; (ii) passing the hydrocarbon stream through the first reactor, the first reactor being a catalytic bed reactor with a dual-function catalyst disposed therein to simultaneously reform light naphtha to BTEX and crack light naphtha to ethane, propane, and butanes; (iii) passing an effluent of the first reactor to a gas-liquid separating unit to generate a liquid stream comprising the BTEX and a gas stream comprising the ethane, propane, and butanes; (iv) passing the gas stream to a gas separator unit to remove hydrogen gas and methane from the gas stream and generate an enhanced gas stream comprising an increased concentration of ethane, propane, and butanes; and (v) passing the enhanced gas stream through a second reactor, the second reactor being a pyrolysis unit operated at steam cracking conditions to convert the ethane, propane, and butanes of the enhanced gas stream to light olefins including ethylene, propylene, and butenes; wherein the integrated process does not include passage of a process stream to a separate and independent hydrocracking unit to crack light alkanes in the hydrocarbon stream to smaller alkanes.

A second aspect includes the process of the first aspect in which the dual-function catalyst comprises a nano ZSM-5 zeolite catalyst.

A third aspect includes the process of the first or second aspect in which the dual-function catalyst comprises a nano ZSM-5 zeolite coated with amorphous silica or silica-alumina only on external pores of the nano ZSM-5 zeolite.

A fourth aspect includes the process of the third aspect in which the nano ZSM-5 zeolite coated with amorphous silica or silica-alumina comprises 1 to 20 weight percent of the amorphous silica or silica-alumina.

A fifth aspect includes the process of the third aspect in which the nano ZSM-5 zeolite coated with amorphous silica or silica-alumina comprises 3 to 7 weight percent of the amorphous silica or silica-alumina.

A sixth aspect includes the process of any of the third through fifth aspects in which the first reactor is pressurized with nitrogen gas to a pressure of 1 to 50 bar at a space velocity of 0.1 to 100 $h^{-1}$.

A seventh aspect includes the process of any of the third through sixth aspects in which the integrated process further comprises providing the hydrocarbon stream to a MEROX unit to remove organic sulfur components from the hydrocarbon stream and generate a MEROX sweetened hydrocarbon stream prior to passing the MEROX sweetened hydrocarbon stream through the first reactor.

An eighth aspect includes the process of the seventh aspect in which the MEROX sweetened hydrocarbon stream exiting the MEROX unit comprises less than 100 ppm of organic sulfur components.

A ninth aspect includes the process of any of the third through eighth aspects in which the integrated process further comprises passing the gas stream from gas-liquid separating unit through a gas scrubber unit to remove hydrogen sulfide from the gas stream and generate a sweetened gas stream prior to passing the sweetened gas stream to the gas separator unit.

A tenth aspect includes the process of the first or second aspect in which the integrated process further comprises providing the hydrocarbon stream to a hydrotreater unit operating to convert organic sulfur components from the hydrocarbon stream to hydrogen sulfide and generate a hydrotreated hydrocarbon stream; and further passing the hydrotreated hydrocarbon stream through a separator unit to remove the generated hydrogen sulfide and hydrogen gas from the hydrotreated hydrocarbon stream and generate a hydrotreated sweetened hydrocarbon stream prior to passing the hydrotreated sweetened hydrocarbon stream through the first reactor An eleventh aspect includes the process of the tenth aspect in which the hydrotreater unit comprises a CoMo/alumina or NiMo/alumina catalyst and operates at a temperature of 250 to 350° C. with a space velocity of 1 to 10 $h^{-1}$.

A twelfth aspect includes the process of the tenth or eleventh aspect in which the hydrotreated hydrocarbon stream exiting the hydrotreater unit comprises less than 1 ppm of organic sulfur components.

A thirteenth aspect includes the process of any of the tenth through twelfth aspects in which the dual-function catalyst comprises a nano ZSM-5 zeolite impregnated with one or more metals.

A fourteenth aspect includes the process of the thirteenth aspect in which the dual-function catalyst is impregnated with one or more of platinum, palladium, iridium, rhenium, and ruthenium.

A fifteenth aspect includes the process of the thirteenth aspect in which the dual-function catalyst is impregnated with one or more noble metals and one or more of copper, cobalt, zinc, iron, tungsten, and molybdenum.

A sixteenth aspect includes the process of the first through fifteenth aspects in which the hydrocarbon stream comprises a boiling point of 90 to 315° F.

A seventeenth aspect includes the process of any of the first through sixteenth aspects in which the hydrocarbon stream comprises light naphtha having a boiling point of 90 to 200° F.

An eighteenth aspect includes the process of any of the first through seventeenth aspects in which the catalytic bed reactor of the first reactor is a fixed bed reactor.

A nineteenth aspect includes the process of any of the first through seventeenth aspects in which the catalytic bed reactor of the first reactor is a moving bed reactor.

A twentieth aspect includes the process of any of the first through nineteenth aspects in which the hydrocarbon stream is provided to the first reactor at a liquid space velocity of 0.1 to 20 $h^{-1}$.

A twenty-first aspect includes the process of any of the first through twentieth aspects in which the first reactor operates at a reaction temperature of 400 to 700° C.

A twenty-second aspect includes the process of any of the first through twenty-first aspects in which the second reactor operates at a cracking temperature of 750 to 900° C.

A twenty-third aspect includes the process of any of the first through twenty-second aspects in which the second reactor operates with a steam to hydrocarbon ratio of 0.1:1 to 0.6:1.

A twenty-fourth aspect includes the process of any of the first through twenty-third aspects in which the integrated process further comprises collecting the liquid stream from the gas-liquid separating unit and processing for further separation of the liquid stream.

A twenty-fifth aspect includes the process of any of the first through twenty-fourth aspects in which the integrated process further comprises collecting the hydrogen gas and methane from the gas separator unit for valuable utilization in further processes.

According to a twenty-sixth aspect, a system for conversion of a hydrocarbon stream comprising light naphtha to enhanced value products includes: a first reactor fluidly connected to the hydrocarbon stream, the first reactor being a catalytic bed reactor with a dual-function catalyst disposed therein to simultaneously reform light naphtha to BTEX and crack light naphtha to ethane, propane, and butanes; a gas-liquid separating unit fluidly connected to an outlet of the first reactor, the gas-liquid separating unit configured to generate a liquid stream comprising the BTEX at a liquid outlet and a gas stream comprising the ethane, propane, and butanes at a gas outlet; a gas separator unit fluidly connected to the gas outlet of the gas-liquid separating unit, the gas separator unit configured to remove hydrogen gas and methane from the gas stream and generate an enhanced gas stream comprising an increased concentration of ethane, propane, and butanes at an enhanced gas outlet; and a second reactor fluidly connected to the enhanced gas outlet of the gas separator, the second reactor being a pyrolysis unit operated at steam cracking conditions to convert the ethane, propane, and butanes of the enhanced gas stream to light olefins including ethylene, propylene, and butenes; wherein the system does not include an independent hydrocracking unit to crack light alkanes in the hydrocarbon feed to smaller alkanes.

A twenty-seventh aspect includes the system of the twenty-sixth aspect in which the dual-function catalyst comprises a nano ZSM-5 zeolite catalyst.

A twenty-eighth aspect includes the system of the twenty-sixth or twenty-seventh aspect in which the dual-function catalyst comprises a nano ZSM-5 zeolite coated with amorphous silica or silica-alumina only on external pores of the nano ZSM-5 zeolite.

A twenty-ninth aspect includes the system of the twenty-eighth aspect in which the nano ZSM-5 zeolite coated with amorphous silica or silica-alumina comprises 1 to 20 weight percent of the amorphous silica or silica-alumina.

A thirtieth aspect includes the system of the twenty-eighth or twenty-ninth aspect in which the system further comprises a MEROX unit positioned prior to the first reactor, the MEROX unit configured to remove organic sulfur components from the hydrocarbon stream and generate a MEROX sweetened hydrocarbon stream prior to passing the MEROX sweetened hydrocarbon stream through the first reactor.

A thirty-first aspect includes the system of any of the twenty-eighth through thirtieth aspects in which the system further comprises a gas scrubber unit positioned and fluidly connected between the gas-liquid separating unit and the gas separator unit, the scrubber unit configured to remove hydrogen sulfide from the gas stream and generate a sweetened gas stream prior to passing the sweetened gas stream to the gas separator unit.

A thirty-second aspect includes the system of the twenty-seventh aspect in which the system further comprises a hydrotreater unit and separator unit positioned prior to the first reactor, the hydrotreater unit comprising an inlet for the hydrocarbon stream and configured to convert organic sulfur components from the hydrocarbon stream to hydrogen sulfide and generate a hydrotreated hydrocarbon stream, the separator unit comprising a fluid connection with an outlet of the hydrotreater unit and configured to remove the generated hydrogen sulfide and hydrogen gas from the hydrotreated hydrocarbon stream provided from the outlet of the hydrotreater unit and generate a hydrotreated sweetened hydrocarbon stream prior to passing the hydrotreated sweetened hydrocarbon stream through the first reactor through a fluid connection.

A thirty-third aspect includes the system of the thirty-second aspect in which the hydrotreater unit comprises a CoMo/alumina or NiMo/alumina catalyst.

A thirty-fourth aspect includes the system of the thirty-second or thirty-third aspect in which the dual-function catalyst comprises a nano ZSM-5 zeolite is impregnated with one or more metals.

A thirty-fifth aspect includes the system of the thirty-fourth aspect in which the dual-function catalyst is impregnated with one or more of platinum, palladium, iridium, rhenium, and ruthenium.

A thirty-sixth aspect includes the system of the thirty-fourth or thirty-fifth aspect in which the dual-function catalyst is impregnated with one or more noble metals and one or more of copper, cobalt, zinc, iron, tungsten, and molybdenum.

A thirty-seventh aspect includes the system of any of the twenty-sixth through thirty-sixth aspects in which the catalytic bed reactor of the first reactor is a fixed bed reactor.

A thirty-eighth aspect includes the system of any of the twenty-sixth through thirty-sixth aspects in which the catalytic bed reactor of the first reactor is a moving bed reactor.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

As used in this disclosure and in the appended claims, the words "comprise," "has," and "include" and all grammatical variations thereof are each intended to have an open, non-limiting meaning that does not exclude additional elements or steps.

What is claimed is:

1. An integrated process for conversion of a hydrocarbon stream comprising light naphtha to enhanced value products, the process comprising:
   (i) providing the hydrocarbon stream comprising light naphtha to a first reactor;
   (ii) passing the hydrocarbon stream through the first reactor, the first reactor being a catalytic bed reactor with a dual-function catalyst disposed therein to simultaneously reform light naphtha to BTEX and crack light naphtha to ethane, propane, and butanes, where the dual-function catalyst comprises a nano ZSM-5 zeolite coated with amorphous silica or silica-alumina only on external pores of the nano ZSM-5 zeolite and without noble metal loading;
   (iii) passing an effluent of the first reactor to a gas-liquid separating unit to generate a liquid stream comprising the BTEX and a gas stream comprising the ethane, propane, and butanes;
   (iv) passing the gas stream to a gas separator unit to remove hydrogen gas and methane from the gas stream and generate an enhanced gas stream comprising an increased concentration of ethane, propane, and butanes; and
   (v) passing the enhanced gas stream through a second reactor, the second reactor being a pyrolysis unit operated at steam cracking conditions to convert the ethane, propane, and butanes of the enhanced gas stream to light olefins including ethylene, propylene, and butenes;
   wherein the integrated process does not include passage of a process stream to a separate and independent hydrocracking unit to crack light alkanes in the hydrocarbon stream to smaller alkanes.

2. The integrated process of claim 1, where the nano ZSM-5 zeolite coated with amorphous silica or silica-alumina comprises 1 to 20 weight percent of the amorphous silica or silica-alumina.

3. The integrated process of claim 1, where the first reactor is pressurized with nitrogen gas to a pressure of 1 to 50 bar at a space velocity of 0.1 to 100 $h^{-1}$.

4. The integrated process of claim 1, where the integrated process further comprises providing the hydrocarbon stream to a MEROX unit to remove organic sulfur components from the hydrocarbon stream and generate a MEROX sweetened hydrocarbon stream prior to passing the MEROX sweetened hydrocarbon stream through the first reactor.

5. The integrated process of claim 1, where the integrated process further comprises passing the gas stream from gas-liquid separating unit through a gas scrubber unit to remove hydrogen sulfide from the gas stream and generate a sweetened gas stream prior to passing the sweetened gas stream to the gas separator unit.

6. The integrated process of claim 1, where the integrated process further comprises providing the hydrocarbon stream to a hydrotreater unit operating to convert organic sulfur components from the hydrocarbon stream to hydrogen sulfide and generate a hydrotreated hydrocarbon stream; and
   further passing the hydrotreated hydrocarbon stream through a separator unit to remove the generated hydrogen sulfide and hydrogen gas from the hydrotreated hydrocarbon stream and generate a hydrotreated sweetened hydrocarbon stream prior to passing the hydrotreated sweetened hydrocarbon stream through the first reactor.

7. The integrated process of claim 1, where the hydrocarbon stream comprises a boiling point of 90 to 315° F.

8. The integrated process of claim 1, where the first reactor operates at a reaction temperature of 400 to 700° C.

9. The integrated process of claim 1, where the second reactor operates at a cracking temperature of 750 to 900° C.

10. The integrated process of claim 1, where the second reactor operates with a steam to hydrocarbon ratio of 0.1:1 to 0.6:1.

11. The integrated process of claim 1, where the nano ZSM-5 zeolite coated with amorphous silica or silica-alumina comprises 3 to 7 weight percent of the amorphous silica or silica-alumina.

* * * * *